March 26, 1929. E. F. CHRIST 1,707,113
BRAKE PEDAL HOLDER
Filed June 10, 1927
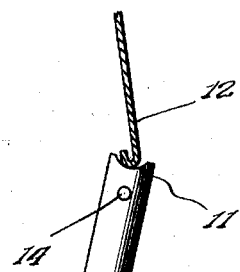
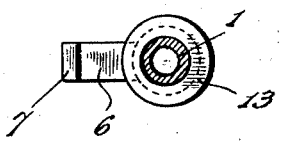
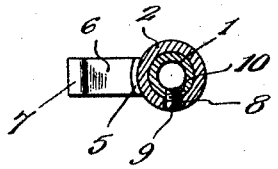
Inventor
E. F. Christ
By Lacey & Lacey, Attorneys Patented Mar. 26, 1929.

1,707,113

UNITED STATES PATENT OFFICE.

ELMER F. CHRIST, OF DUBUQUE, IOWA.

BRAKE-PEDAL HOLDER.

Application filed June 10, 1927. Serial No. 197,936.

This invention relates to a pedal holder and more particularly to a holder by means of which a brake pedal may be retained in a depressed position while adjusting the brakes of an automobile. Much difficulty is experienced in holding the brake pedal of an automobile in a depressed position while the brakes are being adjusted if the work is done in the ordinary manner. At the present time it is customary for one workman to depress the brake pedal by foot pressure while another workman is adjusting the brakes. This not only requires the services of two men but has been found unsatisfactory as the pressure exerted is not uniform at all times and, therefore, it has been found very difficult to properly adjust the brakes and equalize their braking action.

Therefore, one object of the present invention is to provide a device by means of which the brake pedal may be retained in a depressed position while the brakes are being adjusted and thereby eliminate the services of one workman and also insure equal pressure being exerted upon the pedal while all of the brakes are being adjusted.

Another object of the invention is to provide a pedal depressing device which may be easily adjusted to exert the desired pressure upon the pedal and will not be liable to slip when in use.

Another object of the invention is to so form the device that it will be firmly held in engagement with a brake pedal and stationary portion of an automobile, such as the instrument board but permitted to be easily released after the brakes have been adjusted.

The invention is illustrated in the accompanying drawing, wherein

Figure 1 is a view principally in side elevation and showing the improved pedal holder in use;

Fig. 2 is a transverse sectional view through one section of the pedal holder taken on the line 2—2 of Fig. 1, and Fig. 3 is a similar view taken on the line 3—3 of Fig. 1.

The pedal holder or depressing device includes companion sections 1 and 2, the upper one of which preferably consists of a hollow metal rod, as shown in Fig. 2, and is slidably received in the companion section. The said companion section which is indicated by the numeral 2 may be referred to as an elongated casing and has its upper or inner end 3 cut transversely at an incline, as shown in Fig. 1. Its outer or lower end which may be open or closed is intended to bear upon the brake pedal 4 and carries a clip 5 which is welded or otherwise rigidly secured thereon. This clip carries a hinged arm 6 which extends transversely from the casing or section 2 and terminates in a hook 7 intended to engage beneath the pedal so that the section 2 will be held firmly in engagement with the pedal and prevent it from slipping downwardly thereon. A longitudinally extending slot 8 is formed in the casing or section 2 and receives a screw or pin 9 which is removably threaded into a socket 10 formed adjacent the inner end of the rod or section 1 and serves to limit sliding movement of the two sections relative to each other and also prevents them from having rotary movement relative to each other.

The upper section or rod 1 which is telescopically received in the casing or section 2 has its outer end formed with a recess 11 to receive the lower edge portion of the instrument board or dash 12 of an automobile. This section carries a collar 13 which fits loosely thereon and rests upon the inclined upper end of the section 2. By referring to Fig. 1, it will be seen that pressure exerted upon the collar or washer 13 by the higher side portion of the casing will cause the collar to be canted and moved into firm gripping engagement with the rod 1. Therefore, the two sections will be firmly held in an adjusted position and prevented from sliding toward each other out of proper engagement with the brake pedal and dash until the collar is intentionally released. A pin 14 projects transversely from the rod adjacent its upper or outer end and serves to prevent the washer from slipping off this end of the rod and becoming lost.

When it is desired to test or adjust the brakes of an automobile, foot pressure is first exerted upon the pedal to depress it the necessary extent and the device is set in place with the lower end of the casing 2 resting upon the pedal and the hook of the clip 5 engaged with the pedal. The section 1 is then moved upwardly until the lower edge portion of the dash or instrument board 12 is engaged in the notch or recess 11. The section 1 may be easily slid out of the section or casing 2 as the collar 13 fits loosely upon the section 1. After the rod or section 1 has been moved upwardly, the collar will rest upon the higher side portion of the inclined upper or inner end of the section or casing 2 and pressure which the brake pedal exerts upon the casing will cause the collar to be canted into tight binding engagement with the upper section. Therefore, the two sections will be prevented from having longitudinal movement toward each other and the pedal will be retained in the depressed position. The workman can then inspect and make necessary adjustments or repairs to the brakes and there will be no danger of the pressure upon the pedal varying and causing the brakes to have unequal braking action. After the necessary repairs and adjustments have been made to the brakes, the collar may be moved upwardly out of its canted position so that the rod 1 is released from its gripping action and allowed to slide downwardly into the casing. The clip 5 can then be moved out of engagement with the pedal and the device put away until again needed.

Having thus described the invention, I claim:

1. A pedal-depressing device comprising an elongated hollow casing open at its upper end, its lower end being adapted to engage a pedal to be depressed and its upper end being transversely inclined, a support-engaging rod slidable into and out of said casing through the open upper end thereof, and a collar loose upon said rod and adapted to be canted into gripping engagement therewith by contact with the inclined upper end of said casing.

2. A pedal-depressing device comprising an elongated hollow casing open at its upper end, its lower end being adapted to engage a pedal to be depressed and its upper end being transversely inclined, a support-engaging rod slidable into and out of said casing through the open upper end thereof, the casing having a longitudinally extending slot and said rod having a pin extending through the slot to prevent rotation and limit sliding of the rod, and a collar loose upon said rod and adapted to be canted into gripping engagement therewith by contact with the upper end of said casing.

3. A pedal-depressing device comprising companion sections having telescoping engagement with each other, one having its outer end adapted to bear against a stationary support and the outer end of the other section adapted to bear against a pedal, the last-mentioned section having a longitudinally extending slot formed therein and the inner end of the said section being transversely inclined, a pin removably carried by the first section and received in said slot to guide and limit movement of the sections relative to each other, a collar fitting loosely upon the first section and adapted to be canted into gripping engagement therewith by contact with the inclined inner end of the second section, and a pin extending from the outer end portion of the first section to retain said collar thereon.

In testimony whereof I affix my signature.

ELMER F. CHRIST. [L. S.]